United States Patent [19]

Shustorovich et al.

[11] Patent Number: 5,386,690
[45] Date of Patent: Feb. 7, 1995

[54] CATALYTIC SYSTEM

[75] Inventors: Eugene Shustorovich, Pittsford, N.Y.; Veniamin Kalner, Moscow, U.S.S.R.; Konstantin Solntsev, Moscow, U.S.S.R.; Nikolai Moiseev, Moscow, U.S.S.R.; Yuri Buslayev, Moscow, U.S.S.R.; Richard Montano, Vienna, Va.; Aleksandr Bragin, Moscow, U.S.S.R.

[73] Assignee: Blue Planet Technologies Co., L.P., New York, N.Y.

[21] Appl. No.: 118,835

[22] Filed: Sep. 8, 1993

Related U.S. Application Data

[63] Continuation of Ser. No. 841,357, Feb. 25, 1992, abandoned.

[51] Int. Cl.$^6$ .............................................. F01N 3/20
[52] U.S. Cl. ........................................ 60/274; 60/278; 60/295; 60/301; 422/178; 423/213.5
[58] Field of Search ............... 60/295, 274, 278, 301; 422/178; 423/212, 213.5

[56] References Cited

U.S. PATENT DOCUMENTS

| | | | |
|---|---|---|---|
| Re. 25,858 | 9/1965 | Matvay | 60/295 |
| 942,055 | 11/1863 | Steppe | 60/295 |
| 1,989,113 | 1/1935 | Rector . | |
| 2,086,775 | 7/1937 | Lyons et al. . | |
| 2,151,424 | 3/1939 | Lyons et al. . | |
| 2,194,186 | 3/1940 | Pier et al. . | |
| 2,800,172 | 7/1957 | Romer et al. . | |
| 2,946,325 | 7/1960 | Gentile . | |
| 3,091,920 | 9/1965 | Matvay | 60/295 |
| 3,168,368 | 2/1965 | Mills | 60/295 |
| 3,211,534 | 10/1965 | Ridgway | 60/295 |
| 3,220,179 | 11/1965 | Bloomfield | 60/295 |
| 3,224,188 | 12/1965 | Barlow | 60/295 |
| 3,348,932 | 10/1967 | Kukin . | |
| 3,370,419 | 2/1968 | Ketzer | 60/295 |
| 3,450,116 | 6/1969 | Knight et al. . | |
| 3,537,434 | 11/1970 | Herpin . | |
| 3,716,040 | 2/1973 | Herpin . | |
| 3,746,498 | 7/1973 | Stengel . | |
| 3,773,894 | 11/1973 | Bernstein et al. . | |
| 3,800,532 | 4/1974 | Schischkow . | |
| 3,844,261 | 10/1974 | Garcea | 60/278 |
| 3,856,901 | 3/1974 | Neumann et al. . | |
| 3,862,819 | 1/1975 | Wentworth . | |
| 3,875,922 | 4/1975 | Kirmss . | |
| 3,910,850 | 10/1975 | Turner . | |
| 3,929,118 | 1/1975 | Leong . | |
| 3,953,369 | 4/1976 | Ohara et al. . | |
| 3,959,183 | 5/1976 | Gospodar . | |
| 3,978,193 | 8/1976 | Fedor et al. . | |
| 3,979,185 | 9/1976 | Stevenson . | |
| 4,016,837 | 4/1977 | Wentworth et al. . | |
| 4,024,079 | 5/1977 | Okuyama et al. . | |
| 4,048,098 | 9/1977 | Koberstein et al. . | |
| 4,064,037 | 12/1977 | Graven et al. . | |
| 4,064,039 | 12/1977 | Penick . | |
| 4,090,838 | 5/1978 | Schena . | |
| 4,118,199 | 10/1978 | Völker et al. . | |
| 4,118,339 | 10/1978 | Latos . | |
| 4,170,960 | 10/1979 | Germack et al. . | |
| 4,188,309 | 2/1980 | Völker et al. . | |

(List continued on next page.)

FOREIGN PATENT DOCUMENTS 942055  11/1963  United Kingdom ................. 60/295

Primary Examiner—Douglas Hart
Attorney, Agent, or Firm—Kenyon & Kenyon

[57] ABSTRACT

A catalyst system comprising a metal catalyst in a liquid catalyst solution, means for adding metal catalyst from the solution to a combustion system, and a catalyst collector for collecting the metal catalyst which serves as a reaction vessel. A method for converting emissions from a combustion chamber comprising providing a source of metal catalyst in a liquid solution; adding the metal catalyst to a combustion system; carrying the metal catalyst to a catalyst collector: depositing the metal catalyst on a solid surface in the catalyst collector; and converting the emissions for the combustion chamber by contacting the emissions and the metal catalyst. Preferably, the metal catalyst solution contains a plurality of metals.

4 Claims, 3 Drawing Sheets

U.S. PATENT DOCUMENTS

| | | |
|---|---|---|
| 4,197,272 | 4/1980 | Tighe . |
| 4,203,895 | 5/1980 | Parcell et al. . |
| 4,214,615 | 7/1980 | Boyer . |
| 4,218,422 | 8/1980 | Schock et al. . |
| 4,255,173 | 3/1981 | Mayer et al. . |
| 4,295,816 | 10/1981 | Robinson . |
| 4,317,918 | 3/1982 | Takano et al. . |
| 4,362,130 | 12/1982 | Robinson . |
| 4,382,017 | 5/1983 | Robinson . |
| 4,397,772 | 8/1983 | Noakes et al. . |
| 4,410,467 | 10/1983 | Wentworth . |
| 4,419,967 | 12/1983 | Protacio et al. . |
| 4,425,304 | 1/1984 | Kawata et al. . |
| 4,462,208 | 7/1984 | Hicks et al. . |
| 4,475,483 | 10/1984 | Robinson . |
| 4,476,339 | 10/1984 | Reinhard et al. . |
| 4,542,226 | 9/1985 | Eddy et al. . |
| 4,631,076 | 12/1986 | Kurihara . |
| 4,646,516 | 3/1987 | Bostock . |
| 4,665,690 | 5/1987 | Nomoto et al. . |
| 4,752,302 | 6/1988 | Bowers et al. . |
| 4,757,045 | 7/1988 | Turner et al. . |
| 4,842,617 | 6/1989 | Kukin . |
| 4,863,889 | 9/1989 | Passaretti-Miscia . |
| 4,868,148 | 9/1989 | Henk et al. . |
| 4,891,050 | 1/1990 | Bowers et al. . |
| 4,892,562 | 1/1990 | Bowers et al. . |
| 4,919,903 | 4/1990 | Gandhi et al. . |
| 4,939,113 | 7/1990 | Tauster et al. . |
| 5,073,532 | 12/1991 | Domesle et al. . |
| 5,094,821 | 3/1992 | Hitachi et al. . |
| 5,140,810 | 8/1992 | Kuroda . | ated emissions, require a
chloride "blocking agent" where a glycol solvent is
employed, and contain undesirably high levels of water.
Moreover, the solutions create an undesirable acidic
and corrosive environment. The patents do not teach or
suggest use of a solvent such as a diethylene glycol
derivative, or that the solution could be used for deposition onto a surface within the exhaust system of an
automobile.

Accordingly, there is a need for alternative methods
of converting automotive emissions not utilizing conventional pre-fabricated, additional, non-regenerable
solid catalytic material-containing supports in the exhaust system of an automobile.

CATALYTIC SYSTEM

This is a continuation of application Ser. No. 07/841,357, filed Feb. 25, 1992, entitled CATALYTIC SYSTEM, now abandoned.

FIELD OF THE INVENTION

This invention relates to catalytic systems, more particularly to automotive emission conversion systems and systems for providing metal catalysts for converting automotive emissions.

BACKGROUND OF THE INVENTION

There has long been a need to employ catalysts in reactions such as simultaneous combustion leading to oxidation of carbon monoxide and unburned hydrocarbons, and the reduction of nitrogen oxides (NOx) which are emitted from automotive engines and the like. The role of catalysts, particularly three-way catalysts, in automotive emission control has been widely studied in the art. For example, Taylor, "Automobile Catalytic Converter", *Catalysis, Science and Technology*, pp. 119-67 (Anderson et al. eds. 1984), describes emission control technology, composition of three-way catalysts and catalytic supports.

Conventional systems for converting automotive exhaust gases employ pre-fabricated supported catalysts, typically a solid stratum of catalyst material, such as honeycombed ceramic structures, which are placed in the exhaust section of the automobile. As the emissions pass through the solid, the catalytic metal present on the strata aids in conversion of CO, NOx and unburned hydrocarbons to $CO_2$, $N_2$ and $H_2O$. However, the solid strata-type catalytic converter eventually becomes spent, and requires removal and replacement in the exhaust portion of the engine. Moreover, structures such as a honeycomb support are complex and relatively expensive to manufacture. State of the art systems capable of carrying out three-way catalysis include those having supported noble metals such as rhodium and platinum, with rhodium being a preferred catalyst for the reaction:

$$NO + CO \rightarrow \tfrac{1}{2}N_2 + CO_2$$

Platinum is the preferred catalyst for oxidation of CO and unburned hydrocarbons.

The noble metals are expensive and in limited supply, particularly rhodium. This is exacerbated by the fact than current usage of Pt and Rh in three-way catalysis exceeds the Rh/Pt mine ratio. Thus, reduction of noble metal usage is a problem of three-way catalysis. Therefore, it is necessary to develop alternative approaches to emission control.

U.S. Pat. Nos. 4,295,816, 4,382,017 and 4,475,483 describe catalyst solutions and delivery systems for improving the efficiency of combustion chambers. The catalyst solutions described in these patents comprise (a) a single metal catalyst compound, $H_2PtCl_6 \cdot 6H_2O$; a chloride compound such as HCl. LiCl, or NaCl; an antifreeze compound such as ethylene glycol; and approximately 50 percent water by volume, (b) a single platinum group metal catalyst in water and a layer of oil containing a manganese catalyst provided on top of the surface of the water, or (c) a single rhenium metal catalyst in water, or in a glycol solvent containing a chloride blocking agent, and a layer of oil containing a manganese catalyst provided on top of the surface of the water. The solutions are not taught or suggested for use in aiding conversion of automotive emissions, require a chloride "blocking agent" where a glycol solvent is employed, and contain undesirably high levels of water. Moreover, the solutions create an undesirable acidic and corrosive environment. The patents do not teach or suggest use of a solvent such as a diethylene glycol derivative, or that the solution could be used for deposition onto a surface within the exhaust system of an automobile.

Accordingly, there is a need for alternative methods of converting automotive emissions not utilizing conventional pre-fabricated, additional, non-regenerable solid catalytic material-containing supports in the exhaust system of an automobile.

OBJECTS AND SUMMARY OF THE INVENTION

In light of the foregoing, it is an object of the invention to provide a catalytic system capable of converting emissions from automotive engines.

It is a further object of the invention to provide a catalytic system capable of converting automotive emissions without the need for an additional, pre-fabricated, non-regenerable solid catalytic support system in the exhaust portion of an engine.

These and other objects of the invention are accomplished by a catalytic system comprising a metal catalyst in a liquid catalyst solution, means for adding metal catalyst from the solution to a combustion system, and a catalyst collector for collecting the metal catalyst which can serve as a reaction vessel. The invention further comprises a method for converting emissions from a combustion chamber comprising providing a source of metal catalyst in a liquid solution; adding the metal catalyst to a combustion system; carrying the metal catalyst to a catalyst collector and reaction vessel; depositing the metal catalyst on a solid surface in the catalyst collector and reaction vessel; and converting the emissions from the combustion chamber by contacting the emissions and the metal catalyst.

DETAILED DESCRIPTION OF THE PREFERRED EMBODIMENTS

Figure 1:
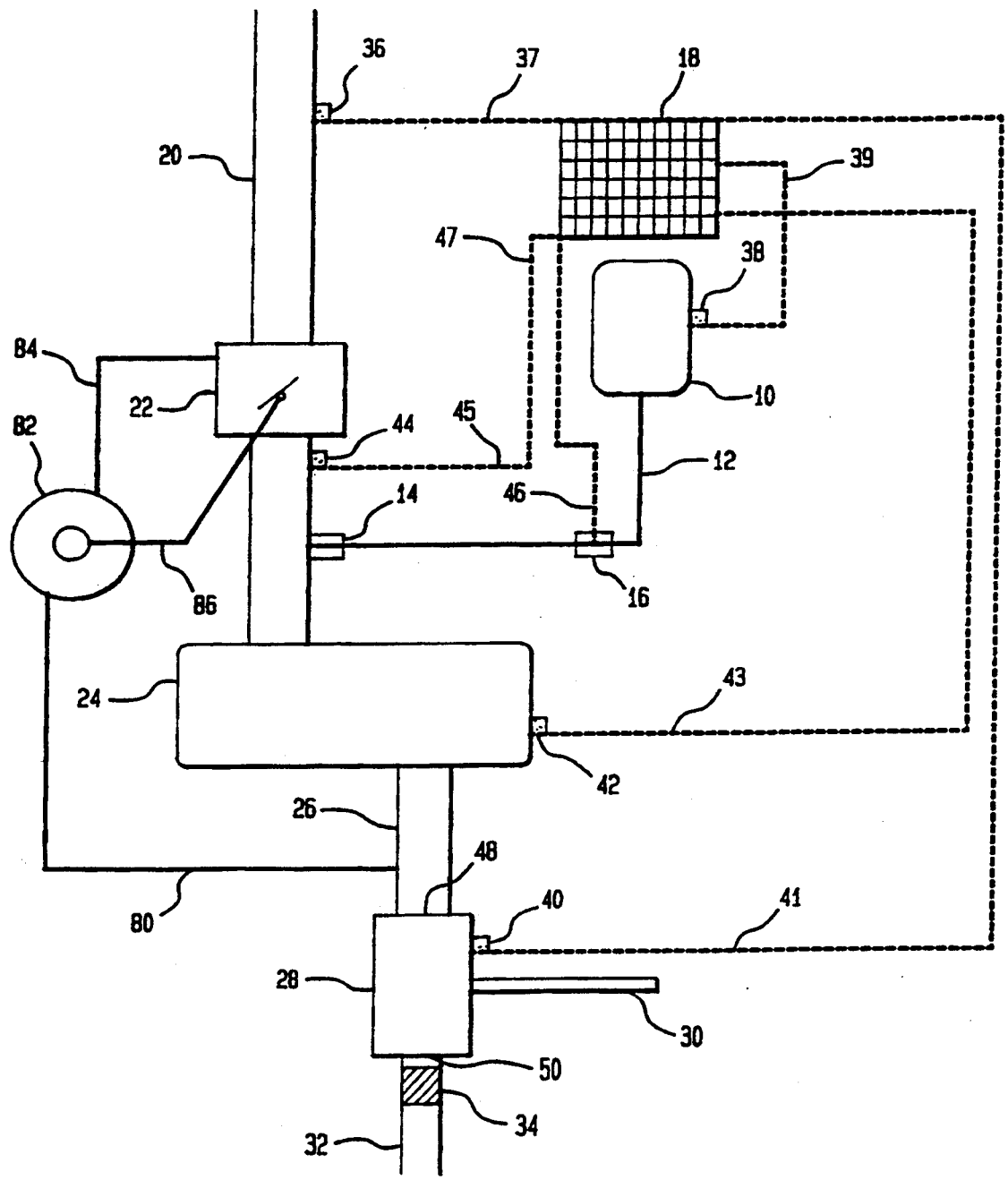
FIG. 1 is a schematic of a catalytic system of the present invention.

The catalytic systems of the present invention comprise a source of metal catalyst, means for adding metal catalyst to a combustion system, a catalyst collector for collecting the metal catalyst and for serving as a reaction vessel in the conversion of starting materials such as automotive emissions to final products.

The source of metal catalyst preferably is a catalytic solution containing one or more metal compounds in a suitable solvent. Metals useful in the present invention include middle transition metals, particularly Group VIIA metals such as rhenium, and ending transition metals, such as Group VIIIA metals including platinum and rhodium. The metals are present in compound forms such as chlorides, carbonyls, perrhenates, and oxides in the solution. Preferred solvents for the metal compounds include glycol derivatives, and in particular diethylene glycol derivatives such as diglyme [$CH_3O(CH_2)_2O(CH_2)_2OCH_3$], triglyme and tetraglyme. Other preferred solvents include alkyl pyrrolidones such as N-methyl pyrrolidone and alkoxy ethyl ethers such as bis-[2-[2-methoxy-ethoxy]ethyl] ether. Diglyme is a particularly preferred solvent. In the most preferred embodiment, the solution contains $H_2PtCl_6.6H_2O$, $LiReO_4$ and $RhCl_3.4H_2O$ in diglyme. A co-pending application U.S. Ser. No. 841,356, filed Feb. 25, 1992 contains further details and embodiments of suitable solutions for use in the present invention, and the disclosure of that application is incorporated herein by reference.

The catalyst source is connected to a means for adding the metal catalyst to the combustion system. Suitable means can include an atomizer, a pump with a restraining orifice, or a nozzle. Due to the physical and chemical properties of catalyst solutions, which can be used in the present invention, the solution can be exposed to the incoming air into the automotive engine. In this embodiment, as the air passes over the solutions which can be used in the present invention, the catalyst compound becomes entrained and is carried into and through the combustion chamber with or without any additional pumping or other assistance.

The catalyst collector is located downstream of the combustion chamber. The collector receives the catalyst and serves as a reaction vessel for conversion of automotive emissions to $CO_2$, $N_2$, and $H_2O$. The catalyst collector is any surface capable of retaining the catalyst and making the catalyst sufficiently available for reaction with automotive emissions which flow past the collector. The collector can be any section of exhaust system. While it is preferred that the collector is a muffler or muffler-like system, as is explained more fully below, the collector can also be a section of the tailpipe of an automotive system. In this embodiment, the catalyst is deposited on the surface of the tailpipe and acts as a reaction site for the emissions passing through the tailpipe.

Preferably, the collector is a muffler or muffler-like system having a series of trays and/or baffles and/or a packed bed, with the inclusion of a packed bed particularly preferred. A co-pending application U.S. Ser. No. 840,860, filed Feb. 25, 1992 contains further details and embodiments of suitable collectors for use in the present invention, and the disclosure of that application is incorporated herein by reference. The surface of the muffler should allow the catalyst to be retained in the collector sufficiently to convert emissions passing through the collector. It is preferred that the muffler surface either be made from a solid material having a structure capable of retaining the metals from the catalytic solution, or contain cracks or pores on its surface capable of retaining the catalytic metal. Suitable muffler surface materials can include steel, iron, ceramics, and thermosetting polymers, with low carbon steel being particularly preferred. Low carbon steel refers to steel having a carbon content less than about 0.5 percent by weight.

In a particularly preferred embodiment, the muffler further contains an additional material capable of retaining the metal catalyst. It has been found that iron and iron compounds, as well as steels, particularly low carbon steel, in the form of shavings, are especially useful in the practice of the invention. The low carbon steel shavings preferably are acid washed and packed into the muffler. As the metal catalyst is carried into the muffler, the catalyst is deposited on the steel. Emissions passing through the muffler from the combustion chamber can then contact the catalyst and be converted to $N_2$, $CO_2$ and $H_2O$. CO and unburned hydrocarbons are oxidized and NOx is reduced on the metal sites. Each of these components is chemisorbed onto the metal site, and after conversion, the reaction products are desorbed, making the site available for further conversion. The catalysis reaction preferably is a three-way catalysis: oxidizing CO, oxidizing unburned hydrocarbons, and reducing NOx. Optionally, an additional oxidation catalyst can be employed to increase the conversion of CO and unburned hydrocarbons emitted from the combustion chamber.

In another embodiment, secondary air can be added to the catalyst collector to promote oxidation of CO and unburned hydrocarbons, instead of or in addition to use of the optional oxidation catalyst. Where employed, secondary air is added to comprise about 1 to 15 volumetric percent of the gas flow through the muffler. Preferably about 2 to 4 percent secondary air is utilized.

Addition of the metal catalyst can be controlled, for instance, by a microprocessor. Control of metal catalyst feed can desirably increase the efficient use of the catalyst, and decrease the amount of catalyst used to convert a given level of emissions. Feed control can be based on a variety of parameters in the system, including the temperature of the air intake into the automotive system, the temperature of the metal catalyst source solution, the temperature in the catalytic collector, the flow rate of the emissions from the engine (as measured, for example, by engine rpm and intake vacuum).

Use of a catalytic system of the present invention has been shown to permit operation of an automotive engine in a leaner regime, thereby increasing fuel economy. Conventional automotive engines adapted to convert emissions sufficiently to meet current United States pollutant level requirements of conversion of 76% NOx, 94% CO and 94% unburned hydrocarbons must operate at an air number of about 0.90 to 1.03 (with an air number of 1.0 equivalent to a stoichiometric air:fuel ratio of 14.7:1 by weight). With catalytic systems of the present invention, the engine can be operated at air numbers above 1.10 and still meet pollutant level requirements.

Referring to FIG. 1, there is shown a catalyst system of the invention. The system contains a catalytic reservoir 10 connected by a catalytic feed line 12 to an atomizer 14. A catalytic feed valve 16 is positioned in feed line 12 to meter the flow of catalytic feed to atomizer Reservoir 10 may be any suitable container for the liquid catalytic feed solution. Preferred materials for reservoir 10 are non-reactive or have a non-reactive inner coating, and include glass, teflon, fiberglass coated with teflon, steel coated with glass, and plastic coated with teflon. Glass and teflon are particularly preferred. In a typical automotive system, reservoir 10 preferably has an internal volume of about 0.5 liters. Feed line 12 should be non-reactive with the catalyst solution, and preferably is made from stainless steel or non-reactive rubber. Feed valve 16 may be any suitable valve for regulating the flow of feed through feed line 12. Preferably, valve 16 is controlled electronically, such as by catalytic delivery control 18. A particularly preferred feed valve is a solenoid valve such as a teflon PTFE solenoid valve sold under Catalog Number L-01367-70 by Cole Palmer Instrument Co. (Chicago, Ill.).

Atomizer 14 preferably mistifies the catalytic feed by contacting the liquid feed with a vibrating nozzle tip, forming drops of feed when the ultrasonic energy exceeds the surface tension of the liquid. A particularly preferred atomizer is the Series 8700-120MS (Micro Spray ®) Ultrasonic Atomizing Nozzle sold by Sono-Tek Corporation (Poughkeepsie, N.Y.).

Atomizer 14 is connected to automotive air intake line 20, and preferably is located downstream of air-fuel ratio control 22. Air intake 20 leads to combustion chamber 24, which is provided with an exit conduit 26. The combustion chamber 24 can be any suitable cheer, such as those present in a typical automobile internal combustion engine. Conduit 26 preferably is a typical combustion engine exhaust line.

Conduit 26 is connected to vessel 28, which is a site of catalytic collection and emission conversion. Vessel 28 may be a section of the exhaust tailpipe, but preferably is a muffler. A particularly preferred muffler has a series of trays having low carbon steel shavings packed thereon. Vessel 28 preferably contains a plurality of distinct chambers. In a particularly preferred embodiment, vessel 28 contains three chambers. The first chamber contains low carbon steel shavings, and is primarily a site of reduction of NOx. The second chamber preferably contains low carbon steel shavings, and serves as a mixing enhancer of secondary air from secondary air inlet line 30 and the exhaust gases passing through the first chamber of vessel 28. Inlet line 30 preferably is made from steel and is connected to an air source such as a belt-driven air compressor. The third chamber contains low carbon steel shavings, and is primarily a site of oxidation of CO and unburned hydrocarbons. Suitable embodiments for vessel 28 are more fully described in the co-pending application U.S. Ser. No. 840,860, filed Feb. 25, 1992.

Vessel 28 is connected to a system exhaust line 32, which preferably is a typical automotive tailpipe. Exhaust line 32 contains a catalyst structure 34. Structure 34 preferably contains an oxidation catalyst, such as iron, steel, or copper, or compounds thereof, with cuprous oxide compounds being particularly preferred. The oxidation catalysts of structure 34 preferably is formed into a thin sheet which is rolled tightly into a cylindrical form and then positioned in structure 34.

Catalytic delivery control 18 preferably monitors several system parameters and controls the rate of catalytic feed through feed valve 16. Control 18 preferably is a microprocessor. The system preferably has a plurality of monitors which provide data to catalytic delivery control 18. Temperature probe 36 monitors the temperature of the air intake in line 20. Probe 36 preferably is a thermocouple capable of sending signals such as analog or digital signals to control 18 via line 37. Likewise, catalytic supply temperature probe 38 monitors the temperature of the catalytic feed in reservoir 10, and transmits appropriate signals to control 18 via line 39. Temperature probe 40 monitors the temperatures in vessel 28, and sends appropriate signals to control 18 via line 41.

In an automotive engine system, the flow rate of gaseous material in the system can be monitored by rpm monitor 42. Monitor 42 measures the engine speed, such as in revolutions per minute, and transmits appropriate signals via line 43 to control 18. Monitor 42 preferably is a conventional rpm monitor having a magnet on a flywheel.

Vacuum monitoring valve 45 measures the vacuum intake into combustion chamber 28 by placing a spring-biased valve in the path of the air intake. As the engine rpm increases, the capillary vacuum decreases, until the spring bias overcomes the vacuum force and closes the valve. When the valve closes, a circuit is completed, sending an appropriate signal to control 18. If desired, control 18 can shut off the feed through atomizer 14 when the vacuum valve is closed.

The system is also provided with a recirculation line 80, which recirculates at least a portion of the contents traveling through conduit 26 back into air-fuel ratio control 22. Recirculation line 80 is connected to a recirculation valve 82. Valve 82 preferably switches from fully closed to fully open, with no intermediate positions. Valve 82 is capable of monitoring the air-fuel intake into the system and to be opened and closed via line 86. Valve 82 is also coupled to recirculation feed line 84, which is adapted to feed the recirculated contents of conduit 26 into air-fuel ratio control 22.

In operation, the system performs as follows. Control 18 monitors system conditions through monitors 36, 38, 40, 42 and 44. When conditions are appropriate, control 18 sends a signal via line 47 to feed valve control 46 to open feed valve 16. Catalytic feed solution flows from reservoir 10, through line 12 and feed valve 16, to atomizer 14. Preferably, there is no additional pumping of the solution into atomizer 14. Atomizer 14 injects a spray or mist of the catalytic feed solution into air intake line 20. Preferably, atomizer injects about 0.001 to about 3.5 milliliters per second of catalytic feed into line 20, when feed is to be introduced. A feed rate of about 0.003 ml/second is preferred. Feed preferably is introduced for 2 to 10 seconds per minute during engine warm-up until the engine reaches its normal operating temperature. It has been found that a total feed of about 100 to 500 milliliters per 60,000 miles of driving is preferred, with about 300 ml/60,000 miles particularly preferred.

The catalytic feed is then transported along air intake 20 into and through combustion chamber 24. It is believed that the feed is carried in the form of small liquid droplets by the gas in air intake line 20 to combustion chamber 24. It is believed that in chamber 24, the temperature is sufficient to alter the metal compound to a metal, so that, for example, substantially all of the $H_2PtCl_6.6H_2O$ is altered to Pt. It is preferred that substantially none of the metal catalyst be consumed in combustion chamber 24, so that substantially all the metal catalyst can be available for deposition and reaction in vessel 28. The catalyst feed exits combustion chamber 24 through conduit 26 and is carried into vessel 28.

In vessel 28, the metal catalyst is deposited on a surface such as the vessel walls, vessel trays or packing material present in the vessel. While not wishing to be bound by theory, it is believed that the metal catalyst is chemisorbed on the surface, and is highly dispersed so that a large amount of precious metal surface available for reaction is obtained. It is believed that significantly more metal catalyst atoms are available for reaction in the system of the invention than in conventional catalytic converters.

Once the catalyst is chemisorbed on a surface in vessel 28, it is believed that a conventional three-way catalysis of emissions occurs. That is, unburned hydrocarbons are oxidized, CO is oxidized, and NOx is reduced to $H_2O$, $CO_2$ and $N_2$. Among unburned hydrocarbons it is believed that olefinic, other unsaturated, and cyclic hydrocarbons are oxidized preferentially, with saturated hydrocarbons, and methane in particular, oxidized less preferentially. It is believed that unburned hydrocarbons are generally oxidized preferentially with respect to CO present in the emissions. After oxidation and reduction are carried out, the $H_2O$, $CO_2$ and $N_2$ products are desorbed, and the site is available for further reaction. The catalyst present in vessel 28 should be periodically replenished by injection of additional catalytic feed solution into the system.

It is believed that three-way catalysis occurs substantially throughout vessel 28 from inlet 48 to outlet 50. However, it has been found that a proportionally greater amount of reduction takes place nearest to inlet 48 of vessel 28, while a proportionally greater amount of oxidation takes place nearest to outlet 50 of vessel 28.

Secondary air inlet 30 provides excess air to vessel 28 to aid in the oxidation reactions, particularly in carbon monoxide oxidation to $CO_2$. Preferably, air inlet 30 is positioned approximately halfway between inlet 48 and outlet 50 of vessel 28. It is preferred that secondary air inlet 30 provide approximately 3 percent of the volumetric flow rate downstream of air inlet 30 in vessel 28.

As the emissions pass through outlet 50 of vessel 28, they are transported through oxidation catalytic structure 34. Oxidation structure 34 preferably contains Fe or Cu and serves to increase the oxidation efficiency of the system by oxidizing CO and unburned hydrocarbons which pass through vessel 28 unreacted. The emissions, now largely free of CO, NOx and unburned hydrocarbons, pass out exhaust line 32, such as to the atmosphere.

Recirculation valve 82 preferably is in the closed position during engine idle and when the engine is running with the carburetor fully open. In the intermediate operating ranges, where the carburetor is partially open, line 86 will open valve 82 to permit contents of conduit 26 to be recirculated through lines 80 and 84 into air-fuel control 22. Such a recirculation system is particularly preferred if the engine runs in a lean regime. In lean regimes, the pollutants contained in conduit 26 will contain relatively large amounts of NOx. The ratio of NOx:CO in lean regimes can approach 1.0. It has been found that NOx conversion in the present system is preferably carried out where the NOxCO ratio is about 0.01 to 0.10. Thus, recirculation of at least a portion of the contents of conduit 26 is preferable to decrease the NOx:CO ratio for the pollutants emitted from combustion chamber 24 and improve NOx conversion.

When a sufficient amount of metal catalyst has been provided to vessel 28, control 18 closes feed valve 16 to prevent further introduction of feed into air intake line 20. It has been found that entry of catalytic feed into air intake line 20 is most preferred when the engine is operating at low rpm, such as about 600 to 2800 rpm. It is particularly preferred to introduce the feed into the system during engine warm-up, that is, before the engine reaches its normal operating temperature.

Figure 2:
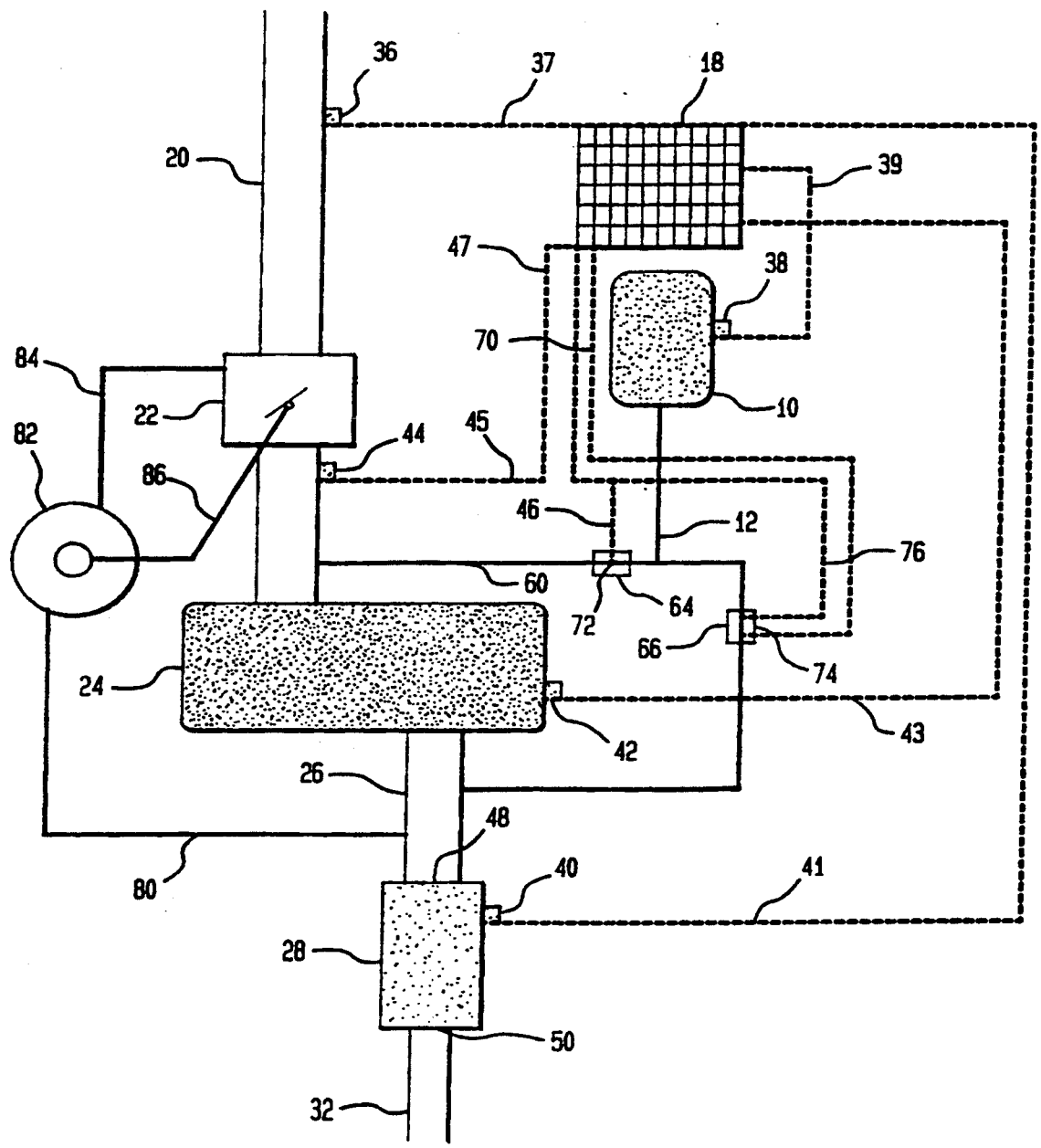
FIG. 2 is a schematic of a second embodiment of a catalytic system of the present invention.

Referring to FIG. 2, there is shown an alternate catalyst system of the present invention. The system contains many of the same elements as the system of FIG. 1, with like-numbered elements representing like components of the systems. The system of FIG. 2 does not include a secondary air source or oxidation catalyst structure downstream of vessel 28, unlike the system of FIG. 1.

Additionally, the catalytic feed from line 12 in FIG. 2 is branched into two feed lines 60, 62. Feed line 60 is a precombustion feed line, which introduces catalytic feed to the combustion system upstream of combustion chamber 24 in air take line 20. Feed line 62 is a postcombustion feed line, which introduces catalytic feed to the combustion system downstream of combustion chamber 24 into conduit 26. Introduction of feed through each of precombustion line 60 and postcombustion line 62 can be by an atomizer, as described with reference to FIG. 1.

Each of feed lines 60, 62 are provided with a feed valve 64, 66, respectively. Feed valve 64 contains a valve control 72 connected via line 68 to control 18. Feed valve 66 contains a valve control 74 connected via line 70 to control 18. Additionally, segment 76 of line 68 connects valve control 72 and valve control 74.

The system depicted in FIG. 2 operates in a similar manner as the system of FIG. 1. Catalytic feed is introduced into the combustion system through either or both of feed lines 60, 62 from reservoir 10. The combustion system includes the combustion chamber, and the associated inlet and outlet conduits. The proportion of feed from each line can be varied and controlled by valves 64, 66 and controller 18. The metal catalyst is transported to vessel 28, where it is deposited on a surface and aids in conversion of CO, unburned hydrocarbons, and NOx to $CO_2$, $H_2O$ and $N_2$. The products are then carried out the system through exhaust line 32.

Figure 3:
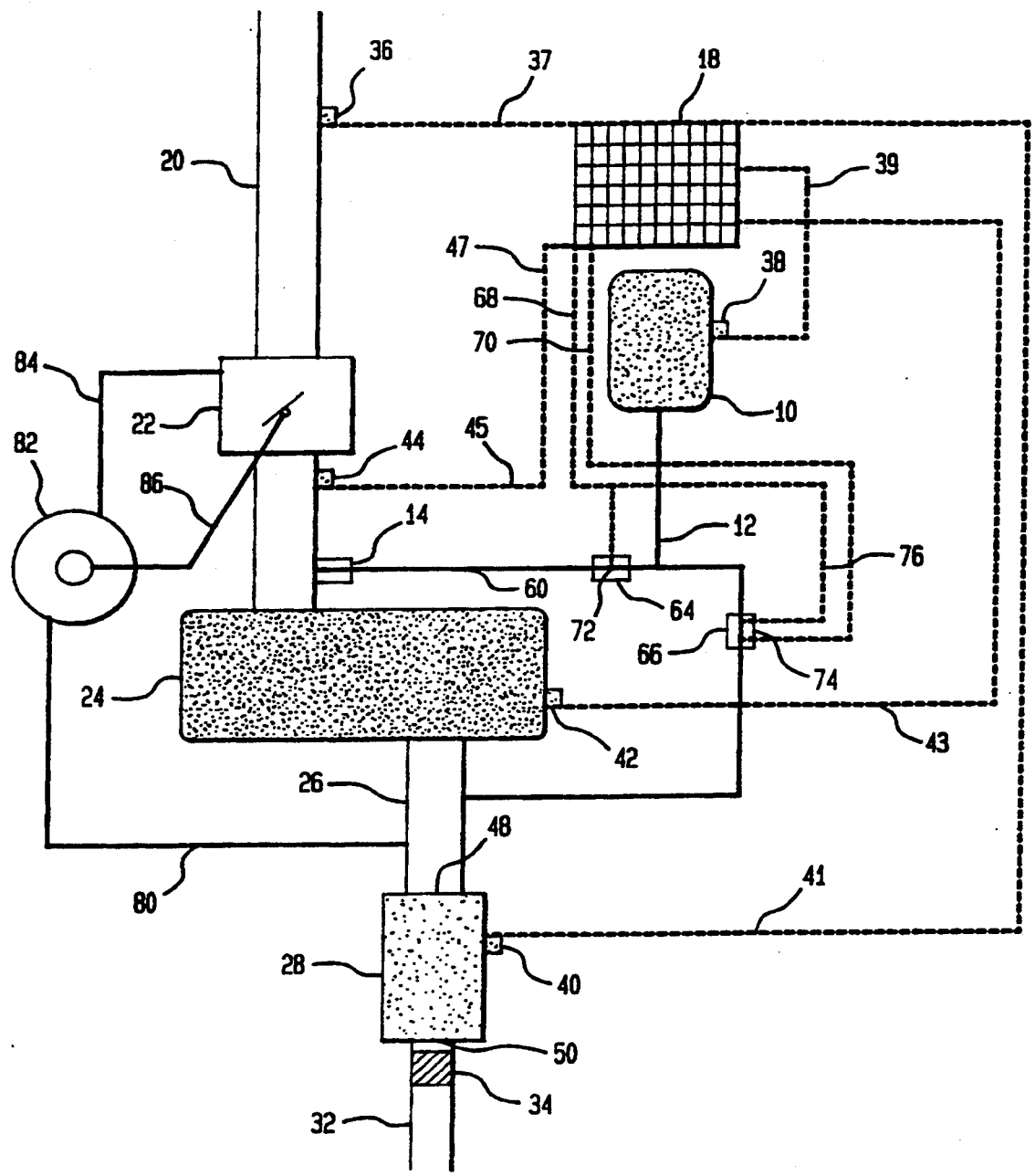
FIG. 3 is a schematic of a third embodiment of a catalytic system of the present invention.

Referring to FIG. 3, there is shown another catalytic system of the invention. The catalytic system of FIG. 3 is identical to the system of FIG. 2, except that an oxidation catalyst structure 34 has been positioned at the outlet 50 of vessel 28. Like numbered elements of FIGS. 2 and 3 represent like components. Oxidation catalyst structure 34 preferably contains iron or copper, and serves to increase the oxidation efficiency of the system by converting unreacted CO and unburned hydrocarbons exiting vessel 28. The system of FIG. 3 operates in substantially the same manner as that of FIG. 2, with additional CO and unburned hydrocarbons oxidized by catalyst 34.

What is claimed is:

1. A method for converting emissions from a combustion chamber comprising:
    (a) providing (i) a source of three-way metal catalysts containing one or more metals selected from the group consisting of Group VIIA metals and Group VIIIA metals, (ii) a combustion system, and (iii) a catalyst collector;
    (b) monitoring a plurality of system conditions selected from the group consisting of the air intake temperature of the combustion system, the catalyst source temperature, the catalyst collector temperature, and the engine speed;
    (c) in response to the monitored system conditions, adding the metal catalysts to the combustion system upstream of the combustion chamber at a controlled rate and amount;
    (d) transporting the metal catalysts to the catalyst collector located downstream of the combustion chamber;
    (e) depositing the metal catalysts by adsorption onto a surface in the catalyst collector; and
    (f) converting emissions from the combustion chamber by contacting the emissions and the deposited metal catalysts in the collector such that three-way catalytic reactions are carried out in the collector to oxidize carbon monoxide and unburned hydrocarbons and to reduce nitrogen oxides.

2. A method according to claim 1 wherein the catalyst source contains at least two catalyst metals.

3. A method according to claim 1 wherein the metals are selected from the group consisting of one or more of Pt, Rh, Re.

4. A method according to claim 3 wherein the metals are present in compounds selected from the group consisting of one or more of $H_2PtCl_6.6H_2O$, $LiReO_4$, $Re_2O_7$, and $RhCl_3.4H_2O$.

* * * * *